Figure 3:
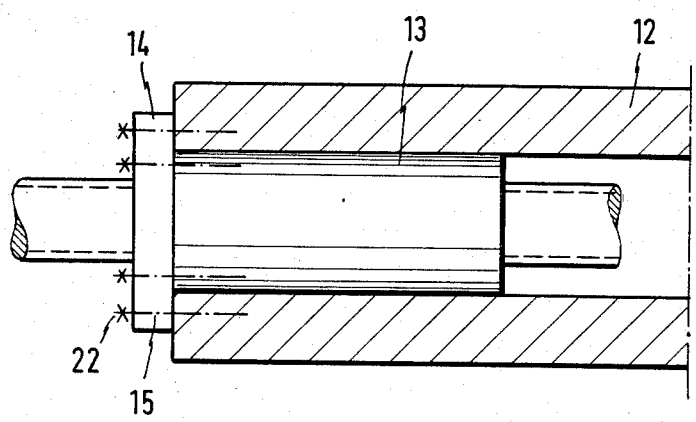

United States Patent [19]

Horsky et al.

[11] Patent Number: 4,536,112
[45] Date of Patent: Aug. 20, 1985

[54] PROTECTION DEVICE AGAINST OVERLOADS IN A MACHINE

[75] Inventors: Anton Horsky, Göppingen; Siegfried Kuhn, Dürnau; Wolf-Dietrich Voss, Boll, all of Fed. Rep. of Germany

[73] Assignee: Oerlikon-Boehringer GmbH, Göppingen, Fed. Rep. of Germany

[21] Appl. No.: 499,150

[22] PCT Filed: Sep. 22, 1982

[86] PCT No.: PCT/EP82/00212
§ 371 Date: May 20, 1983
§ 102(e) Date: May 20, 1983

[87] PCT Pub. No.: WO83/01030
PCT Pub. Date: Mar. 31, 1983

[30] Foreign Application Priority Data

Sep. 23, 1981 [DE] Fed. Rep. of Germany ....... 3137878

[51] Int. Cl.³ .............................................. B23B 21/00
[52] U.S. Cl. .............................. 409/134; 74/424.8 R; 82/27; 403/2; 403/337; 411/389; 411/395
[58] Field of Search .................. 409/134, 220; 82/27, 82/21 R, 22, 24 R, 34 A; 74/424.8 R; 411/378, 389, 395, 424; 403/2, 337; 464/33

[56] References Cited

U.S. PATENT DOCUMENTS

| 1,637,994 | 8/1927 | Keller | 403/2 X |
|---|---|---|---|
| 1,982,915 | 12/1934 | Jenks | 403/2 X |
| 2,060,593 | 11/1936 | Schaurte et al. | 411/378 X |
| 2,615,373 | 8/1952 | Pegard | 74/424.8 X |
| 3,000,577 | 9/1961 | Ferguson | 464/33 X |
| 3,171,511 | 3/1965 | Pierce | 74/424.8 X |
| 3,244,038 | 4/1966 | Lacy | 82/27 |
| 3,511,444 | 5/1970 | Vitez | 241/32 |
| 3,521,413 | 7/1970 | Scott et al. | 411/389 X |
| 3,733,940 | 5/1973 | Harman et al. | 82/27 X |
| 4,148,235 | 4/1979 | Gerth | 82/27 X |
| 4,195,538 | 4/1980 | Brown | 82/27 |
| 4,411,635 | 10/1983 | Boothroyd et al. | 403/2 X |

FOREIGN PATENT DOCUMENTS

| 671427 | 10/1963 | Canada | 74/424.8 R |
|---|---|---|---|
| 2143440 | 3/1973 | Fed. Rep. of Germany | 411/378 |
| 2177211 | 2/1973 | France | 82/27 |
| 2467312 | 5/1981 | France | 411/378 |
| 1528181 | 10/1978 | United Kingdom | 82/27 |

Primary Examiner—William R. Briggs
Assistant Examiner—Glenn L. Webb

[57] ABSTRACT

The invention relates to an overload protection device for a machine tool, in which a carriage carried on the machine bed is displaceable, between the tailstock and the headstock by a lead screw [driven] by a drive motor and a feed gearing, and in which the lead screw nut is joined to the carriage by at least one joining bolt. To permit a very quick restoration of the machine to service after a collision between the carriage and a component present in its path of movement, while the predetermined dimensional relationship is restored without additional readjustment, the overload protection device is constructed such that the joining bolt has a breakaway section in the area of the junction between the carriage and the lead screw nut.

8 Claims, 7 Drawing Figures

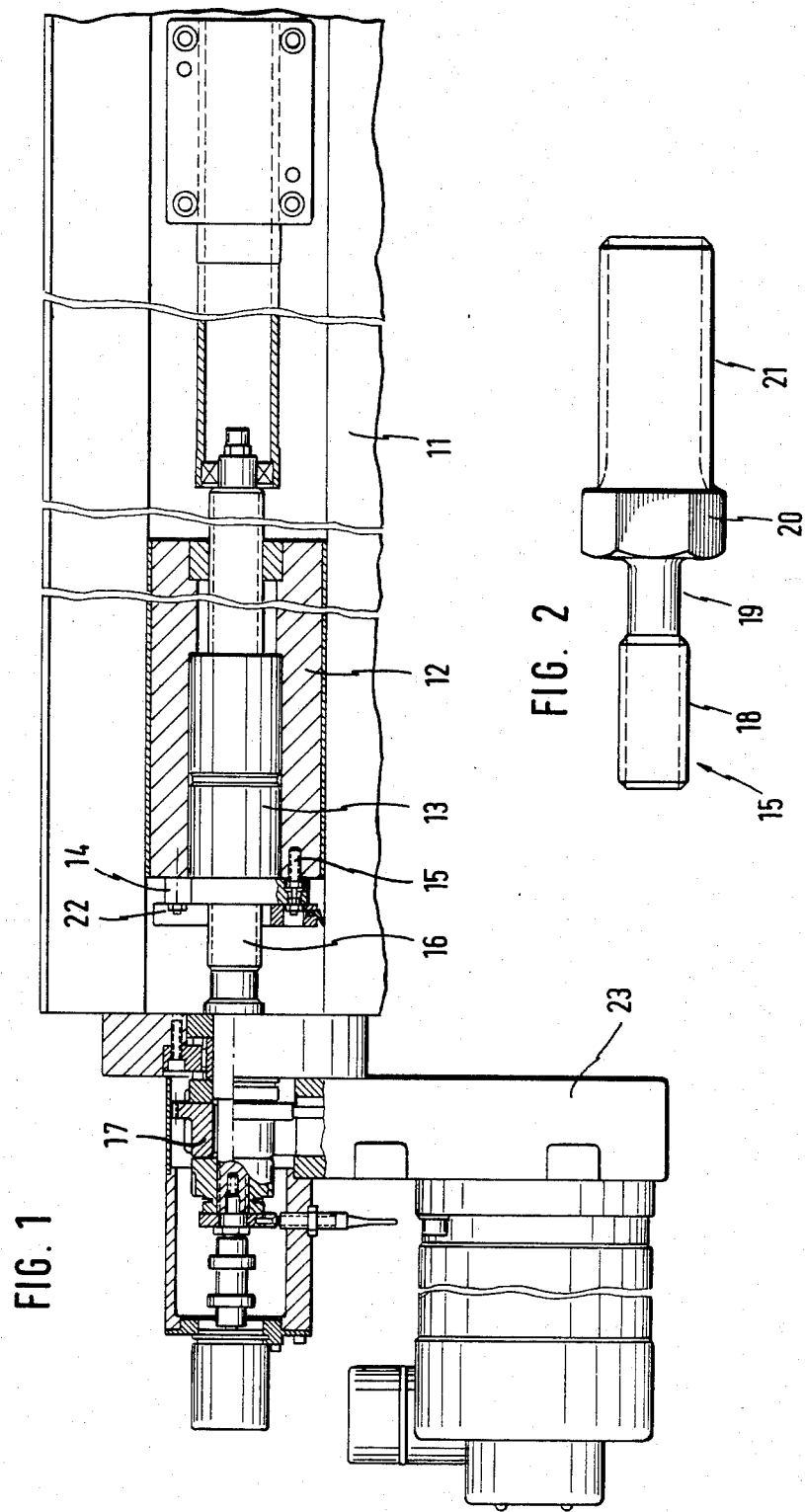

PROTECTION DEVICE AGAINST OVERLOADS IN A MACHINE

The invention relates to a device for protecting against overloads a machine tool having a lead screw for moving a carriage on a machine bed and at least one bolt having a flange and a nut connecting the screw to the carriage.

In machine tools it is known to provide an overload clutch between the lead screw for driving the carriage and the lead screw drive, for the purpose of uncoupling the motor if a collision occurs between the carriage and the chuck holding the workpiece. Such clutches are indeed capable of protecting the motor against damage, but they do not keep the lead screw from continuing to revolve in the event of a collision, so that the considerable forces produced thereby can result in damage to the carriage, the lead screw nut or the lead screw itself. It is also possible to provide shear pins at suitable locations, but these are unsuitable inasmuch as they also have to transmit the dynamic forces and the forces required for the machining operation.

Another disadvantage is that, in the event of a collision, the axial mounting of the lead screw is damaged. Also, the predetermined dimensional relationship between the lead screw nut and the tool rest is destroyed.

In the event of a collision, therefore, difficult and time-consuming repair work and replacement parts are required, which delay the restoration of the machine to service.

The object of the invention is to create an overload protection device which will make possible a very quick restoration of the machine to service after a collision between the carriage and any component that may be in its path, in which case the predetermined dimensional relationship will be restored without further readjustment.

This object is achieved in accordance with the invention by providing at least one connecting screw between the flange and the carriage, and at least one connecting screw between the flange and the nut, with each of said connecting screws having a break-away section.

Desirable further developments of the invention will become apparent from the remaining description.

In the event of a collision of the carriage with a stationary component, such as the chuck holding the workpiece, the lead screw of the carriage, which carries the tool slide rest, does not come immediately to a stop, so that considerable forces in the axial direction are exerted against the joining bolt by the lead screw nut. By the appropriate dimensioning of the break-away section of the joining bolt, which is under tension, it can be made to break at a specific stress.

Thus, if a collision occurs and breakage occurs at the break-away section, what takes place is the release of the connection between the nut and the carriage. At the same time, the second thread section, which is screwed into the carriage by means of the head of the joining bolt, remains in the carriage, while the first thread section, together with the remnant of the break-away section and the retaining nut, comes away from the lead screw nut. The first thread section can then easily be removed from the lead screw nut together with the retaining nut; this is also possible in the case of the second thread section of the joining bolt, since it can be unscrewed by means of the bolt head. Easy repair can thus be accomplished by the insertion of a new joining bolt.

The threaded bore for the accommodation of the second thread section of the joining bolt is best constructed such that the thread is not damaged even by a number of collisions. Its reuse is thus possible.

The use of a joining bolt of this kind also has the advantage that minor collisions can be detected by routine inspections, since such collisions in the plastic deformation range of the break-away section of the joining bolt produce a change in the length of the joining bolt and can thus be detected by measurement.

It is an important advantage of the overload protection device that it can be applied to existing machines, since the conventional joining bolts can be replaced by joining bolts provided with a break-away section.

The overload protection can also be constructed such that it can be operative in both directions of carriage movement. This can be accomplished by using at least one joining bolt to attach to the carriage the lead screw nut flange by which it is usually affixed thereto, and providing this joining bolt with a break-away section.

The invention will be explained hereinbelow by way of example, in conjunction with FIGS. 1-7.

Figure 4:
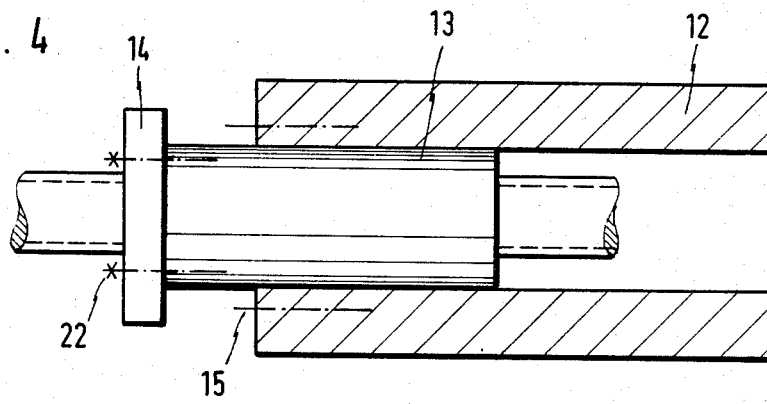
Figure 5:
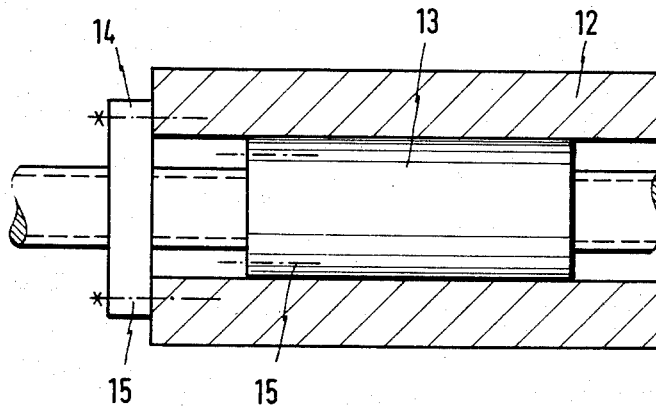
Figure 6:
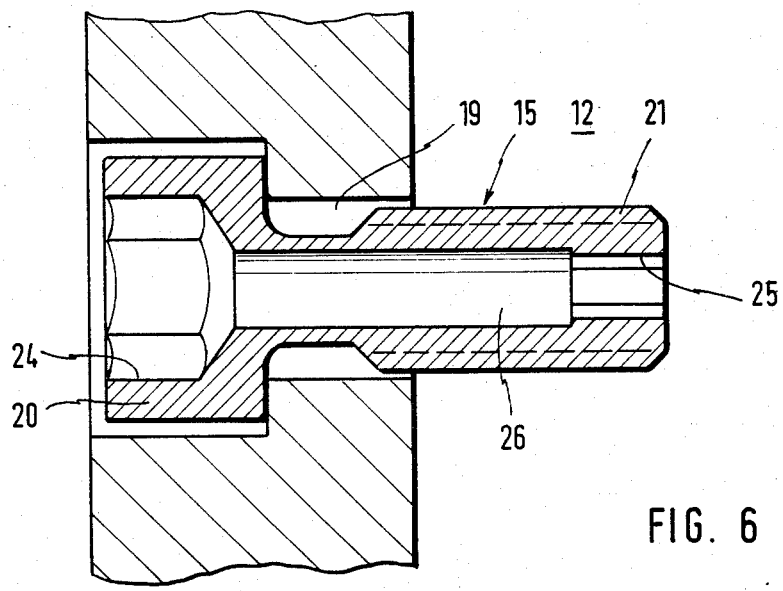
Figure 7:
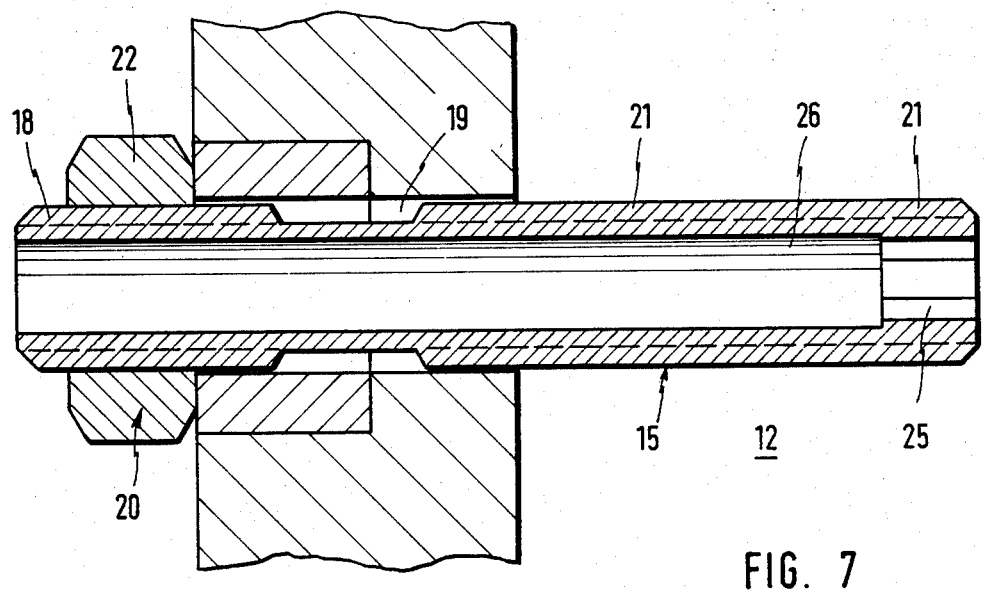

FIG. 1 shows a partially axial cross section of the machine bed, carriage and lead screw of a machine tool, FIG. 2 a view of the joining bolt, FIG. 3 a diagrammatic view of an overload protection device operative in both directions of movement of the carriage, FIGS. 4 and 5 are representations of the manner of operation of the overload protection device of FIG. 3 in both directions of carriage movement, and FIGS. 6 and 7 are axial cross sections of two additional embodiments of the joining bolt.

FIG. 1 shows a portion of a machine tool having a machine bed 11 in which a carriage 12 is guided. In the carriage 12 there is mounted a lead screw nut 13 which is engaged with a lead screw 16.

The lead screw nut has a flange 14 which is joined to the carriage 12 by joining bolts 15. On the lead screw 16 is a drive pinion 17 which is connected by a gearing 23 to a drive motor 24.

FIG. 2 shows one of the joining bolts 15. The bolt has a first thread section 18, a break-away section 19, a bolt head 20 and a second thread section 21. To connect the lead screw nut 13 to the carriage 12, the second thread section 21 of bolt 15 is driven into the carriage 12 by means of the bolt head 20.

The flange 14 of the lead screw nut 13 has a bore which accommodates the bolt head 20, the break-away section 19, and the first thread section 18. The first thread section 18 projects beyond the flange 14, so that the joining bolt 15 joins the flange 19 of the nut 13 to the carriage 12 by means of a retaining nut 22 (FIG. 1).

In the event of a collision between the carriage and, for example, a chuck holding a workpiece, the rotation of the spindle 16, which is not immediately stopped, produces an axial displacement of the lead screw nut 13 which the carriage 12 is unable to accompany. At a certain overload, therefore, the tensioned break-away section 19 of the joining bolt 15 is broken, so that forces can no longer be transferred to the rest of the machine parts.

FIG. 3 shows diagrammatically an overload protection device which is operative in both directions of carriage movement. In this embodiment, the flange 14 is affixed both to the carriage 12 and to the lead screw nut 13 by joining bolts 15 which are constructed like the joining bolts 15 of FIG. 2.

FIG. 4 shows the operation of the overload protection device in the event of a collision of the carriage with, for example, the chuck holding the workpiece. In this case the joining bolts 15 by which the flange 14 is affixed to the carriage 12 are broken. FIG. 5 shows the operation of the overload protection device in the opposite direction. In this case the joining bolts by which the flange 14 is affixed to the lead screw nut 13 are the ones which break.

FIG. 6 shows a joining bolt 15 which consists of a bolt head 20, a break-away section 19 adjoining the head, and a thread section 21. The bolt head 20 and the thread section 21 have each a hexagonal bore 24 and 25, respectively, to accommodate a plug wrench, the hexagonal bores being connected together by a bore 26 enabling the plug wrench to pass through. The joining screw can thus be driven into the carriage 12 by means of a plug wrench having two hexagonal sections, which engages the two different hexagonal sockets 24 and 25. Of course, a plug wrench can also be used which engages only the hexagonal socket 24 of the thread section 21. The tightening of the joining bolt is performed in the same manner.

The advantage of this bolt in regard to its manufacture is that it can be made from an ordinary bolt. The advantage in regard to its use is that the break-away section 19 is not stressed by the driving in of the bolt.

FIG. 7 shows another joining bolt, in which the head end 20 consists of a thread section 18 and a nut 22 which can be threaded onto it, and the thread section 21 has a polygonal socket 25 for the insertion of a plug wrench, the socket 25 being connected to the nut end of the bolt by a bore 26 through which the plug wrench can be passed. A joining bolt of this kind can be made from threaded rod, i.e., both of the thread sections 18 and 21 have the same thread.

We claim:

1. In a machine tool having a machine bed, a carriage carried on said machine bed, a lead screw for reciprocating said carriage on said machine bed, a flange and a lead screw nut connected to the flange and connecting said lead screw to said carriage; an overload protecting device comprising: at least one first connecting screw connecting said flange to said carriage, and at least one second connecting screw connecting said flange to said nut, each of said connecting screws having a break-away section.

2. The combination according to claim 1, wherein each first connecting screw has a first threaded section, said break-away section, and a second threaded section, a head for screwing said second threaded section into said carriage, and a nut threadedly engaging said first threaded section to thereby fix the position of said lead screw nut to said carriage.

3. The combination according to claim 2, wherein said flange has at least one bore, a portion of said first threaded section, said break-away section and said nut of said first connecting screw being located in the said bore.

4. The combination according to claim 2 or 3, wherein said lead screw nut has a threaded bore, said second threaded section of said first connecting screw being threadedly received in said threaded bore.

5. The combination according to claim 1, wherein each first connecting screw has a screw head, said break-away section and a threaded section, said screw head and said threaded section each being provided with a polygonal bore for receiving a plug wrench, said threaded section connecting said connecting screw to said carriage and said screw head fixing the position of said nut of said lead screw.

6. The combination according to claim 5, wherein said polygonal bores have different diameters.

7. The combination according to claim 1, wherein said connecting screw has a screw head, said break-away section, and a threaded section, said threaded section having a polygonal bore, a through-bore extending from said polygonal bore to said screw head for passage of a plug wrench, said threaded section being threadedly engaged in said carriage, said screw head fixing the position of said nut of said lead screw.

8. The combination according to claim 7, wherein said screw head comprises a threaded section and an associated nut.

* * * * *